United States Patent
Orthlieb et al.

(10) Patent No.: US 7,913,314 B2
(45) Date of Patent: *Mar. 22, 2011

(54) APPLICATION RIGHTS ENABLING

(75) Inventors: Carl W. Orthlieb, Ottawa (CA); James D. Pravetz, Sunnyvale, CA (US); Sarah Rosenbaum, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 801 days.

This patent is subject to a terminal disclaimer.

(21) Appl. No.: 11/681,915

(22) Filed: Mar. 5, 2007

(65) Prior Publication Data

US 2007/0150964 A1   Jun. 28, 2007

Related U.S. Application Data

(63) Continuation of application No. 10/080,923, filed on Feb. 21, 2002, now Pat. No. 7,213,269.

(51) Int. Cl.
G06F 21/22 (2006.01)
G06F 17/30 (2006.01)
(52) U.S. Cl. .................... 726/33; 726/30; 705/51
(58) Field of Classification Search .............. None
See application file for complete search history.

(56) References Cited

U.S. PATENT DOCUMENTS

| 5,204,897 | A | 4/1993 | Wyman |
| 5,226,159 | A | 7/1993 | Henson et al. |
| 5,260,999 | A | 11/1993 | Wyman |
| 5,341,429 | A | 8/1994 | Stringer et al. |
| 5,438,508 | A | 8/1995 | Wyman |
| 5,465,299 | A | 11/1995 | Matsumoto et al. |
| 5,509,070 | A | 4/1996 | Schull |
| 5,673,316 | A | 9/1997 | Auerbach et al. |
| 5,708,709 | A | 1/1998 | Rose |
| 5,745,879 | A | 4/1998 | Wyman |
| 5,765,152 | A | 6/1998 | Erickson |
| 5,787,175 | A | 7/1998 | Carter |

(Continued)

FOREIGN PATENT DOCUMENTS

EP   0 565 314 A2   10/1993

(Continued)

OTHER PUBLICATIONS

XML.com, "An Introduction to XML Digital Signatures", http://www.xml.com/pub/a/2001/08/08/xmldsig.html, Aug. 8, 2001, 8 pages.

(Continued)

*Primary Examiner* — Christopher A Revak
(74) *Attorney, Agent, or Firm* — Fish & Richardson P.C.

(57) ABSTRACT

Methods and apparatus, including computer program products, implementing and using techniques for controlling capabilities of a user software application. A user software application is provided, the user software application including a set of disabled operations. Content capable of being operated on by one or more of the disabled operations in the set of disabled operations is received. Application rights information operable to enable an operation in the set of disabled operations to operate on content within a context specified in the application rights information are received and the operation in the set of disabled operations is enabled to operate on the received content. Methods and apparatus for providing content to be operated on by a user software application and methods and apparatus for providing a configurable, context-dependent user software application are also described.

41 Claims, 6 Drawing Sheets

U.S. PATENT DOCUMENTS

| | | | |
|---|---|---|---|
| 5,818,447 | A | 10/1998 | Wolf et al. |
| 5,892,904 | A | 4/1999 | Atkinson et al. |
| 5,940,843 | A | 8/1999 | Zucknovich et al. |
| 6,076,166 | A | 6/2000 | Moshfeghi et al. |
| 6,154,757 | A | 11/2000 | Krause et al. |
| 6,249,794 | B1 | 6/2001 | Raman |
| 6,266,654 | B1 | 7/2001 | Schull |
| 6,282,552 | B1 | 8/2001 | Thompson et al. |
| 6,327,578 | B1 | 12/2001 | Linehan |
| 6,343,297 | B1 | 1/2002 | D'Anjou et al. |
| 6,357,004 | B1 | 3/2002 | Davis |
| 6,393,438 | B1 | 5/2002 | Kathrow et al. |
| 6,415,278 | B1 | 7/2002 | Sweet et al. |
| 6,529,905 | B1 | 3/2003 | Bray et al. |
| 6,532,541 | B1 | 3/2003 | Chang et al. |
| 6,671,805 | B1 | 12/2003 | Brown et al. |
| 6,772,340 | B1 | 8/2004 | Peinado et al. |
| 6,775,655 | B1 | 8/2004 | Peinado et al. |
| 6,796,489 | B2 | 9/2004 | Slater |
| 6,824,051 | B2 | 11/2004 | Reddy et al. |
| 6,829,708 | B1 | 12/2004 | Peinado et al. |
| 6,848,048 | B1 | 1/2005 | Holmes |
| 6,876,984 | B2 | 4/2005 | Tadayon et al. |
| 6,895,503 | B2 | 5/2005 | Tadayon et al. |
| 6,970,866 | B1 | 11/2005 | Pravetz et al. |
| 6,973,445 | B2 | 12/2005 | Tadayon et al. |
| 6,973,618 | B2 | 12/2005 | Shaughnessy et al. |
| 7,010,750 | B2 | 3/2006 | Burky |
| 7,010,808 | B1 | 3/2006 | Leung et al. |
| 7,024,393 | B1 | 4/2006 | Peinado et al. |
| 7,031,943 | B1 | 4/2006 | James et al. |
| 7,051,005 | B1 | 5/2006 | Peinado et al. |
| 7,069,443 | B2 | 6/2006 | Berringer et al. |
| 7,130,445 | B2 | 10/2006 | Ruhl et al. |
| 7,213,269 | B2 * | 5/2007 | Orthlieb et al. ............ 726/33 |
| 7,240,205 | B2 | 7/2007 | Greene et al. |
| 7,268,906 | B2 | 9/2007 | Ruhl et al. |
| 7,278,168 | B1 | 10/2007 | Chaudhury et al. |
| 7,302,576 | B2 | 11/2007 | Greene et al. |
| 7,315,866 | B2 | 1/2008 | Wu et al. |
| 7,315,947 | B2 | 1/2008 | Pravetz et al. |
| 7,353,398 | B2 | 4/2008 | Kra |
| 7,698,559 | B1 | 4/2010 | Chaudhury et al. |
| 2001/0034835 | A1 | 10/2001 | Smith |
| 2002/0002543 | A1 | 1/2002 | Spooren et al. |
| 2002/0013765 | A1 | 1/2002 | Schwartz |
| 2002/0019838 | A1 | 2/2002 | Petrogiannis |
| 2002/0029200 | A1 | 3/2002 | Dulin et al. |
| 2002/0042884 | A1 | 4/2002 | Wu et al. |
| 2002/0065848 | A1 | 5/2002 | Walker et al. |
| 2003/0014483 | A1 | 1/2003 | Stevenson et al. |
| 2003/0028774 | A1 | 2/2003 | Meka |
| 2003/0079175 | A1 | 4/2003 | Limantsev |
| 2003/0105816 | A1 | 6/2003 | Goswami |
| 2003/0145206 | A1 | 7/2003 | Wolosewicz et al. |
| 2003/0182402 | A1 | 9/2003 | Goodman |
| 2003/0217008 | A1 | 11/2003 | Habegger et al. |
| 2003/0221105 | A1 | 11/2003 | Bajaj |
| 2004/0054930 | A1 | 3/2004 | Walker et al. |
| 2004/0078394 | A1 | 4/2004 | Powell et al. |
| 2004/0117726 | A1 | 6/2004 | Inada et al. |
| 2004/0158731 | A1 | 8/2004 | Narin et al. |
| 2004/0230891 | A1 | 11/2004 | Pravetz et al. |
| 2005/0058319 | A1 | 3/2005 | Rhoads et al. |
| 2008/0092239 | A1 * | 4/2008 | Sitrick et al. ............ 726/27 |
| 2008/0092240 | A1 * | 4/2008 | Sitrick et al. ............ 726/27 |
| 2008/0104406 | A1 | 5/2008 | Pravetz et al. |

FOREIGN PATENT DOCUMENTS

| | | |
|---|---|---|
| EP | 1077414 A2 | 2/2001 |
| EP | 1227613 A2 | 7/2002 |
| JP | 8-194748 | 7/1996 |
| JP | 10-513289 | 12/1998 |
| JP | 11-212910 | 8/1999 |
| JP | 2002-41482 | 2/2002 |
| JP | 2002-197069 | 7/2002 |
| WO | 00/54128 | 9/2000 |
| WO | 01/61508 | 8/2001 |
| WO | WO03/007180 | 1/2003 |

OTHER PUBLICATIONS

Microsoft: "Online Help—Word disk" Feb. 6, 2001, pp. 1-6, XP002310447.

Schneier, Bruce, "Merkle's Puzzles (Protocol Building Blocks)", Applied Cryptography. Protocols, Algorithms, and Source Code in C, John Wiley & Sons, New York, 1996, 13 pages.

"Adobe Acrobat 4.0 and Digital Signatures", Adobe Acrobat 4.0, Adobe Systems Incorporated, Nov. 1999, 4 pages.

"Digitally Sign PDF Documents", Adobe Acrobat 5.0, Adobe Systems Incorporated, 2001, 3 pages.

"Editing a Macro with the Macro Recorder", Running Microsoft Word 2000, Microsoft Press, 1999, 6 pages.

Author: Menezes, A.J. (Alfred J.), 1965—Van Oorschot, Paul C. Vanstone, Scott A., Title: Handbook of applied cryptography, ISB: 0849385237, Imprint: Boca Raton: CRC Press, c1977 pp. 33 and 321-383.

Ortiz, S "Email Protection Advances with New Technologies", Computer IEEE Service Center, Los Alamitos, CA, vol. 33, No. 1, XP000951701; ISSN: 0018-9162, , pp. 21-23, Jan. 2000.

U.S. Appl. No. 10/306,779, filed Nov. 27, 2002, Chaudhury et al.

Microsoft Press "Editing a Macro with the Macro Recorder", Running Microsoft Word 2000, 1999, 6 pages.

European Examiner Svante Jonsson, Communication pursuant to Article 94(3) EPC for European Application No. 03 711 189.5-211, dated May 5, 2009, 4 pp.

Japanese Examiner Shiho Iwasaki, Notice of Reason for Rejection, for Japanese Application No. 2003-571898, dated Jun. 30, 2009, 9 pages.

*Advent of Adobe Acrobat 5.0! New Publishing Starting with PDF*, Professional DTP Jun. 2001, first edition, Japan, K.K. Kogakusha, May 15, 2001, June first edition, pp. 37-57 (in particular, p. 45). "partial English translation included".

JP Office Action in JP Pat Appln No. 2003-571898, mailed Jan. 5, 2010, 3 pages.

Itaru Hosomi et al., "Digital Information Logistics Achitecture 'Medial Shell' and its Billing Utilizing Management", Information Process Society Research Report, vol. 98, No. 85, IPSJ SIG Notes, Japan, Information Processing Society of Japan, Oct. 12, 1998, vol. 98, pp. 49-56.

First Office Action, for Canadian Application No. 2,462,818, dated Jun. 14, 2010, 5 pages.

Decision of Rejection, for Japanese Application No. 2003-571898, dated May 11, 2010, 5 pages.

* cited by examiner

APPLICATION RIGHTS ENABLING

CROSS-REFERENCE TO RELATED APPLICATIONS

This application is a continuation of and claims priority to U.S. application Ser. No. 10/080,923 now U.S. Pat. No. 7,213,269, filed on Feb. 21, 2002, which is incorporated herein by reference.

BACKGROUND

This invention relates to usage rights associated with computer software applications. Computer software applications often exist in two or more versions that can perform different sets of functions. It is common for computer software application vendors or manufacturers to offer to users a version of the application with a reduced set of functions and a version with a full set of functions. The version of the computer software application with a reduced set of functions is typically offered for free or at a low cost to the users, while the version with a full set of functions is generally more expensive. One example of a computer software application that is offered in several versions is the Acrobat® application, manufactured by Adobe Systems Inc. of San Jose, Calif. One version of the application, Acrobat® Reader®, has a reduced set of functions, allowing users to view and print platform independent PDF (Portable Document Format) formatted documents. Another version of the application, Acrobat® 5.0, has a full set of functions and additionally allows users to convert various document formats into PDF documents, add bookmarks, set security options, generate miniature PDF previews, comment on and approve PDF documents using digital signatures, add highlights, underlines and notes to PDF documents, and so on.

The existence of more than one version of a computer software application is beneficial to users since any user can determine whether he or she is willing to pay the cost for the version of the computer software application with a full set of functions, or if the version with a reduced set of functions is sufficient for his or her needs. Furthermore, by making available a reduced functionality version of the computer software application, such as Acrobat Reader, for free or at a very low cost, the content format used by the application—in this case PDF documents—can be propagated as a standard. In other words, many users would refrain from buying a full functionality version of the software, such as Acrobat 5.0, in order to create PDF files if the only users that could view the files were people that also had to buy Acrobat 5.0. With a free, limited-functionality version, the use of PDF document has been extended to the Internet, because authors of PDF documents can rely on that an Acrobat Reader can be obtained by any user with Internet access. Many similar examples exist for different types of computer software applications and content formats. However, there are also a number of disadvantages and inconveniences associated with such a system.

A user can receive a file containing electronic data from a content provider, either on some type of tangible medium, such as a compact disc or a diskette, or through downloading the file over a network, such as the Internet. If the user only has installed the version of the computer software application with a reduced set of functions installed on his or her computer, the user can only perform a limited set of operations. However, if the user also wishes to perform an operation on the content of the file and this operation is not in the reduced set of enabled functions, then the user must purchase or in some other way acquire a version of the application with the full set of functionality. In some cases, the content provider may request that the user performs certain operations. In such a case users are typically unwilling to get the more expensive version of the application, in particular if the file or operation will only be used a single time only or very infrequently.

Content providers experience a different set of problems due to the existence of several versions of an application. The content provider cannot be sure that all the users will have the computer software application with the full set of functions installed on their computers. Consequently, the content provider must choose between making available a basic version of the content, which only uses the functions that are offered only in the version of the computer software application with a reduced set of functions, or making available an advanced version of the content, which can use any functionality in the computer software application with a full set of functions. In the first scenario, a content provider can reach all users, but can only rely on functions in the reduced set of functions. In the second scenario, the content provider can only reach a much more limited set of users, but rely on any functions in the full set of functions. Alternatively, the content provider can distribute the version of the computer software application with the full set of functions for free to the users, but this will typically be very costly for the content provider and is therefore often not a very attractive approach from the content provider's point of view.

Furthermore, computer software application manufacturers must develop multiple types of applications that meet the needs of different types of users and different workflows in which the products are used. Developing and manufacturing many versions of the same product is costly for the application developer and producer.

SUMMARY

In general, in one aspect, this invention provides methods and apparatus, including computer program products, implementing and using techniques for receiving a first content in a software application, the software application implementing a first operation that is disabled by default; receiving a request to operate on the first content using the first operation; in response to the request, retrieving a first enabler from a database, the first enabler specifying to the software application an enablement of the first operation only with respect to the first content; and enabling the first operation to operate on the first content within an operating context specified in the first enabler as a result of retrieving the first enabler.

Advantageous implementations can include one or more of the following features. The first content can be content of an electronic document. The document can be a PDF document. The request to operate on the first content using the first operation can be received from a user. Retrieving the first enabler from the database can include querying the database for an enabler that enables the first operation to operate on the first content. The operating context specified in the first enabler can include one or more of: a particular document, a particular type of document, a particular data set, a particular type of data set, a particular computer, a particular set of computers, a particular user, a particular set of users, a particular session, a particular number of sessions, a particular time period, a particular content provider, and a particular document in a particular state. The particular state of the particular document can be defined by a user. The first enabler can be different for different operating contexts.

The techniques can further include enabling one or more of: adding content to the document, adding comments to the document, applying a digital signature to the document, saving the document, performing spell-check of the document, importing form data, exporting form data, submitting document data to the Internet outside a browser environment, and inserting new pages from a template. The techniques can include saving the first enabler on a computer hosting the software application.

In general, in one aspect, this invention provides methods and apparatus, including computer program products, implementing and using techniques in a software application implementing a first operation that is disabled by default, the techniques including detecting a change of a state of a document, and enabling the first operation to operate on the document after the detecting.

Advantageous implementations can include one or more of the following features. The change of the state of the document can be detected by the software application. The techniques can include monitoring a current state of the document; and detecting a change of the state of the document when the current state satisfies one or more conditions. The current state of the document can be monitored by the software application. The techniques can include retrieving a first enabler from a database after the detecting, the first enabler specifying to the software application an enablement of the first operation only with respect to the document; and enabling the first operation to operate on the document within an operating context specified in the first enabler as a result of retrieving the first enabler. The software application can automatically initiate the retrieval of the first enabler from the database after the detecting. The software application can automatically enable the first operation to operate on the document within an operating context specified in a first enabler associated with the document.

The invention can be implemented to realize one or more of the following advantages. A user that has installed a computer software application product that supports enablers, and that is available for free or offered at a low cost by an application provider, can participate in more workflows that may be required by a content provider. A content provider can be certain that all users' computer software applications should be able to perform the same set of operations, either because the functionality is enabled by default, or because the functionality can be enabled after a user has received an enabler. Consequently, the content provider can provide a single version of the content that does not have to be limited to be used in a computer software application with a reduced set of functions but still be able to reach the same, large number of users.

Application providers can deliver computer software applications with one or more standard configurations to users. For example, an application provider can make a "base version" of the application available for free, a "low functionality" version of the application available at a low cost, and a "high functionality" version of the application available at a higher cost. In the "base version" a user can, for example, view content without restrictions, but need one or more enablers to sign, save, or make comments on content. In the "low functionality version," a user can view, sign, save, and make comments on content without restrictions, but need one or more enablers to perform further operations on the content. In the "high functionality version" the user can perform any operations, including viewing content, signing, saving and commenting on content, creating new content, and any other possible operation without restrictions.

A content provider can enable different sets of functions in a computer software application for a particular context, that is, certain functions can be enabled for a particular document, a particular session or a given number of sessions, while other functions can be enabled during a particular time period, for a particular user and/or computer, and so on.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
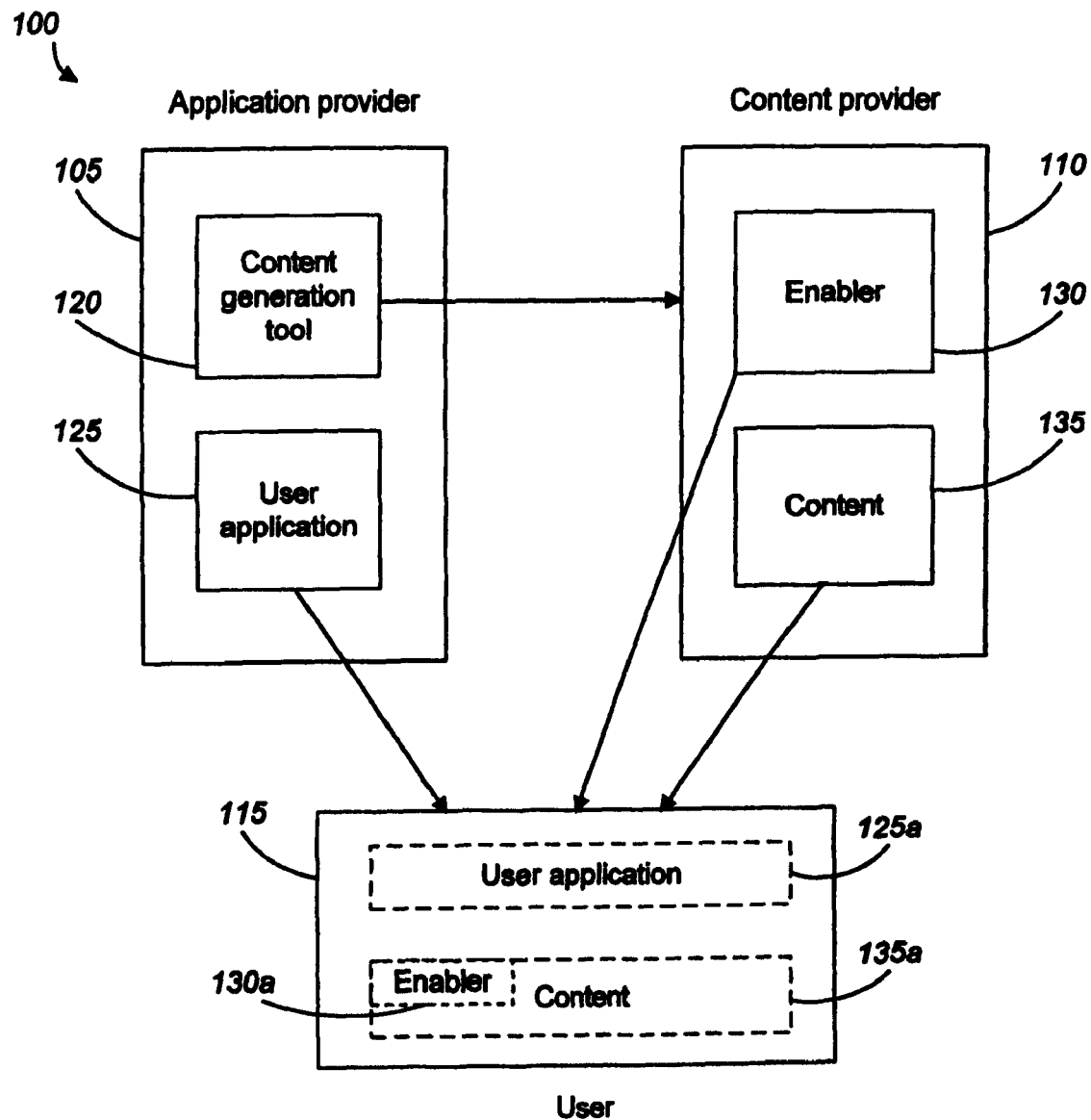
FIG. 1 is a schematic diagram showing the relations between an application provider, a content provider and a user in accordance with the invention.

The invention can be described by way of example from three different aspects: an application provider's point of view, a content provider's point of view, and a user's point of view. An overview (100) of the relations between an application provider (105), a content provider (110), and a user (115), is schematically shown in FIG. 1. The application provider (105), the content provider (110), and the user (115) are typically located in different geographical locations, but may alternatively be located at the same physical location.

The application provider (105) provides a computer software application (125), also referred to as a user software application, to be distributed to one or more users and a content generation tool (120) to be distributed to the content provider (110). The computer software application (125) is typically an introductory level computer software application that is provided for free or at a low cost for the users. The computer software application (125) has a set of enabled default functions that a user can use in any context, and a set of additional functions that are not enabled by default.

The content generation tool (120) allows a content provider to enable one or more functions in the set of additional functions, within a particular context, in the user's computer software application. One mechanism for enabling functions is to generate enablers (130) with the content generation tool (120) and distribute these enablers (130) to one or more users. When an enabler has been installed on a user's computer, the enabler can enable one or more of the additional functions included in the user's computer software application, within a context that is specified in the enabler (130). The content generation tool (120) can also be used by the content provider (110) to generate content (135)) in a format compatible with the user software application and, if the content provider wishes to do so, associate one or more enablers with a particular piece or type of generated content. The enabler (130) and the content (135) can be requested by and/or distributed to one more users (115), separately or together, on a tangible medium or over a communications network such as the Internet. The enabler (130) and the content (135) will be described in further detail below. After the user has obtained the computer software application, the enabler and the content, the user can perform operations on the received content (135a) that have been enabled by the enabler (130a) and provided to the user (115) by the content provider (110).

The invention will now be described in further detail, by way of example, from the point of view of the application provider (105), the content provider (110), and the user (115). It should be clear that many variations that fall within the scope of the invention are possible.

Application Provider's View

Figure 2:
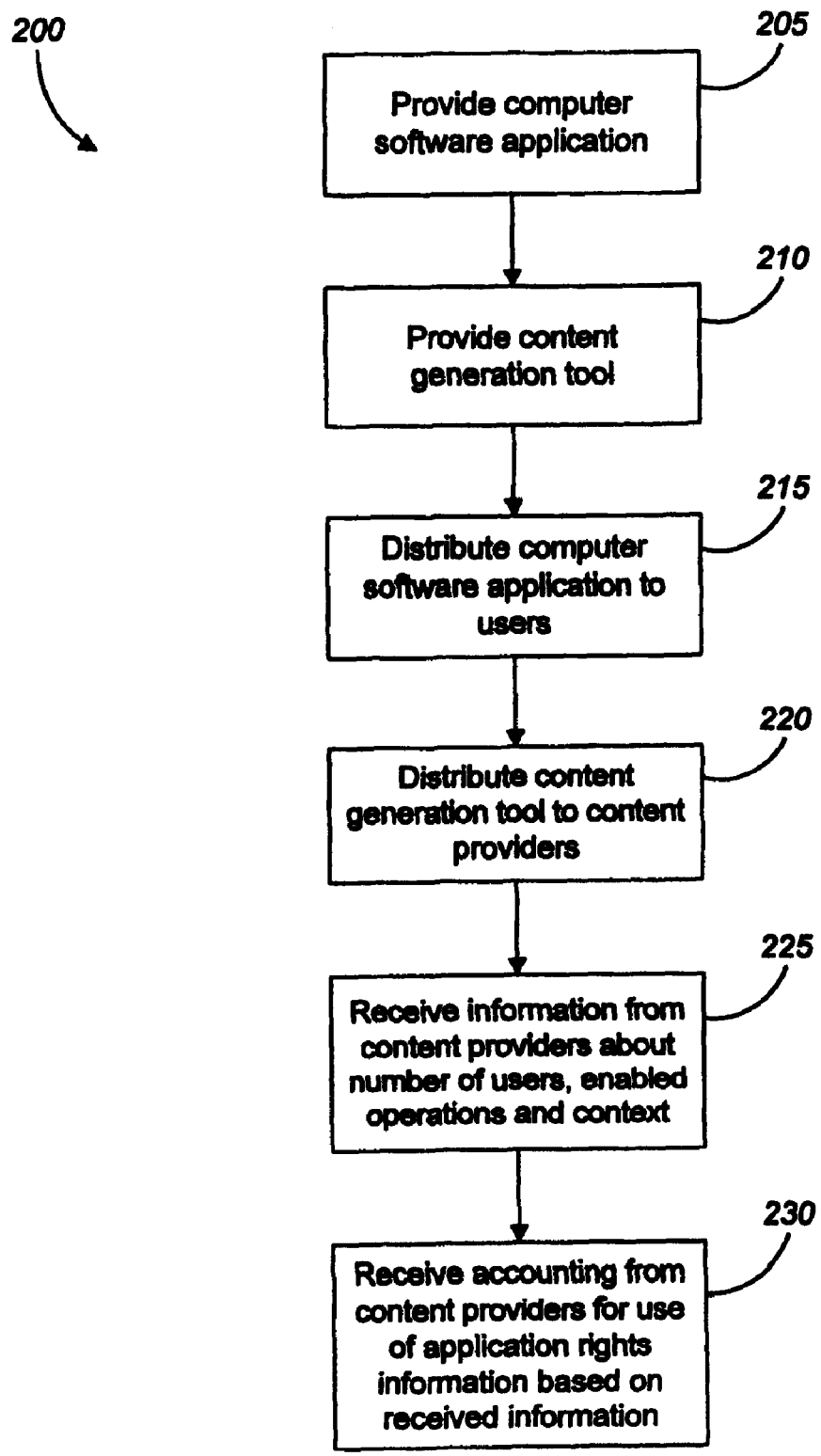
FIG. 2 is a flowchart showing a process from an application provider's point of view for providing and distributing a computer software application and a content generation tool to users and content providers, respectively, in accordance with the invention.

FIG. 2 shows a process (200) from an application provider's point of view for providing and distributing a computer software application and a content generation tool to users and content providers, respectively. The application provider provides a computer software application (205). The computer software application can either be manufactured by the application provider or can be manufactured by some other entity and be distributed to different users by the application provider. The computer software application can be a single application or be a collection of smaller "sub-applications" or services that work together to form an application. As was described above, the computer software application can be made available for free or at low cost to users and contains a set of enabled default functions that are available for unrestricted use by a user. In addition to the set of enabled default functions, the computer software application also contains a set of additional functions that are not enabled by default, but that can be enabled with further authorization. The additional functions can be enabled within a specific context, such as for a predetermined period of time, for a specific document, for a specific computer, for a specific user, and so on. How functions are enabled will be described in further detail below when the content provider's and user's aspects of the invention are discussed.

The application provider also provides a content generation tool (210). The content generation tool can be implemented as a software and/or firmware module and can either be provided as a feature in the computer software application (125), or be provided as a separate stand-alone product. The content generation tool can be used by a content provider to generate content that can be operated on by users using the computer software application (125). The content generation tool can also be used, as described above, to generate enablers that can enable one or more additional functions in a user's computer software application within a given context. Examples of different contexts will be further described below when the role of the content provider is discussed.

Copies of the computer software application are distributed to one or more users (215) and copies of the content generation tool are distributed to one or more content providers (220). The distribution of the computer software application and of the content generation tool can, for example, occur over the Internet or on some form tangible medium, such as a diskette or CD ROM. The distribution can take place as a sale, a promotional offer, or through any conventional business method. The distribution does not necessarily require sending the entire computer software application to the user's computer. For example, in some implementations the users can receive only components of the computer software application that are necessary to communicate over a network with a server or computer hosting the application.

After the application provider has distributed the computer software application and the content generation tool, the application provider receives information from the content providers (225). This information typically includes one or more of the number of users to which the content has been delivered, which operations have been enabled, and the context within which the operations have been enabled. One or more pieces of this information serves as a basis for an accounting from the content providers to the application provider, as a compensation for enabling functions of the computer software application on the users' computers. Finally, based on the information provided, the application provider receives an accounting from the content providers (230). How this is done will be described in further detail below when the content provider's role is discussed.

In a different implementation of the invention, steps 225 and 230 are optional and depend on what type of agreement the content provider has with the application provider. For example, some content providers may be given an unlimited license by the application provider to generate and distribute content and application rights, while other content providers' freedom may be more restricted and they may have to report back to the application provider, as described above.

Content Provider's View

Figure 3:
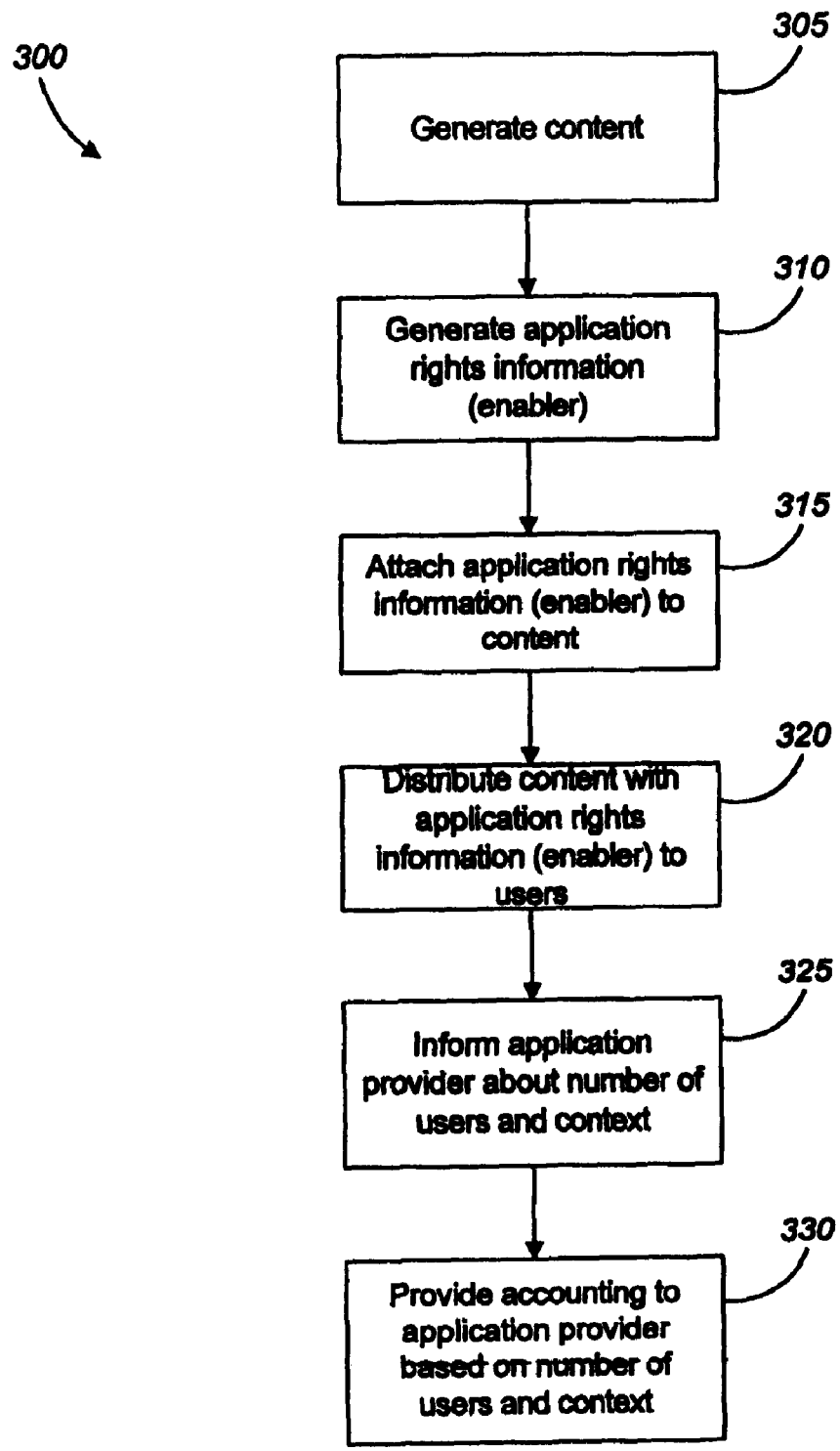
FIG. 3 is a flowchart showing a process from a content provider's point of view for generating content and application rights information for one or more users in accordance with the invention.

FIG. 3 shows a process (300) from a content provider's point of view for generating content and application rights information for one or more users. The content provider uses a content generation tool received from the application provider, as described above, to generate content to be distributed to users (305). The content provider also generates application rights information (310), using the content generation tool. Application rights refer to rights that are associated with processes or operations that can be carried out by a user application. Application rights can be, but do not have to be associated with specific content. In addition to the application rights, a content provider (or author) may associate one or more permissions with a particular piece of content (for example, a document or portion thereof). Permissions are content-specific and restrict what operations can be carried out by a user application. For example, the content provider may set up permissions allowing a user to copy a document, but not print the document. Permissions can override application rights, so that even if a particular user's software application is enabled to perform a particular operation, permissions associated with a particular document or piece of content can prevent a user from performing the operation for that particular document.

In one implementation, the application rights information is implemented as a set of certified authorizations expressed in a rights language. That the authorizations are certified means that the application rights and the context in which the application rights apply are signed by an entity, such as a content provider, that has been certified by another different entity, such as an application provider, to create and modify such application rights.

Application rights information can be required to comply with certain rules. Rules can provide, for example, that users can be authorized to make certain modifications to content, but that "unreasonable modifications," such as replacing all pages in a document, can only be performed by a certified content provider. Another example is that only certified content providers may copy a rights dictionary, which will be discussed in further detail below, from one document to another document. Yet another example is that only content providers may add rights information to existing rights information for certain content. This prevents users from engaging in the extension of their rights or transmission of rights to others without authorization (e.g., without providing for an accounting to the application provider from the content provider or user). The authorization can be performed using standard cryptographic techniques, such as public and private keys.

The application rights information is also referred to as an enabler, as was described above. The application rights information, or enabler, can be embedded into a variety of common content formats, or provided as one or more separate files. The enabler is signed with a private key by the content provider, or some other authorized entity, and contains a description of what rights the user has, and the context within which the rights are applicable. The context of an enabler is flexible and can, for example, include: applies only to this document, applies only to this session or a set number of sessions, applies for a given number of uses, applies in a particular time window, applies only to a specific computer or user, and so on.

Figure 6:
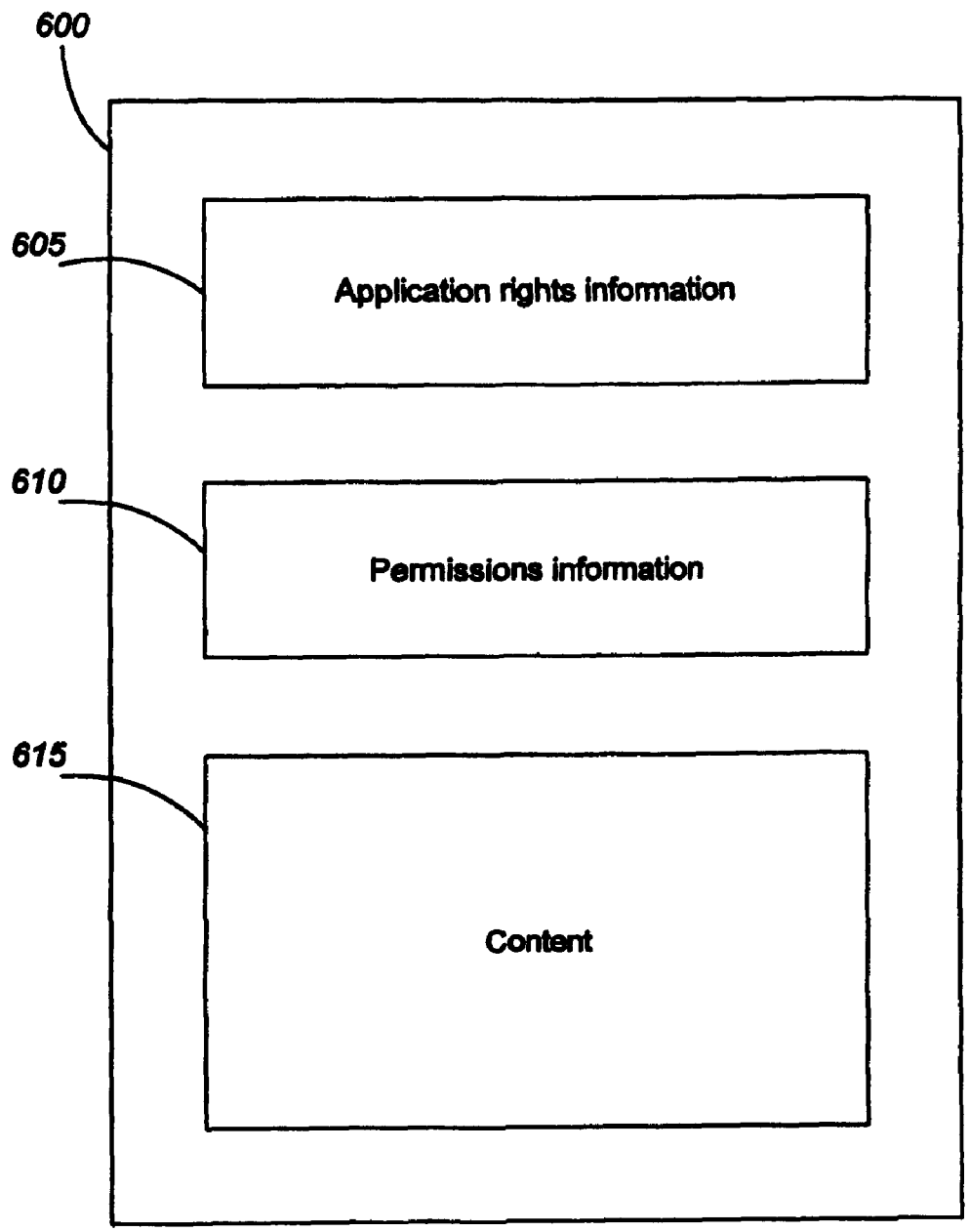
FIG. 6 is a schematic view of a content file with associated application rights and permissions in accordance with the invention.

After the content and application rights information hve been generated, the application rights information is attached to the content (315). The application rights information can be attached by any conventional method, such as embedded into the content file, or included in one or more separate files that are attached to the content file. In another implementation, the application rights information is not attached to the content file, but provided as one or more separate files in addition to the content file. FIG. 6 shows a schematic view of a file (600) that has embedded application rights information (605), permissions information (610) and content (615). In one implementation, the application rights information (605) includes an enumeration or dictionary of rights (that is, what rights are associated with the content), a hash of the file, and a signature of the rights dictionary, such as a public-private key pair or other similar way of authenticating a user. This allows the content provider to give different users different application rights. The hash is based on the content of the file and is created according a suitable conventional hashing algorithm. Every time a document or piece of content is changed a new hash is generated and compared with the previous one. If the document or content is significantly changed, the new hash will differ from the previous one. Significant changes can be, for example, replacing all, or almost all pages of a document with new pages having different content. The hashing algorithm can for example detect this by using the first and last page of a document in creating the hash. Only certified content providers are allowed to make significant changes, which prevents a user from acting as a content provider. The permissions information (610) include an enumeration of permissions and optionally a password that may be required for the user to decrypt the content (615) of the file if the content has been encrypted by the content provider.

Next, as can be seen in FIG. 3, the content provider distributes the content and the application rights information to one or more users (320), either separately or together with the application rights information, depending on how the content and application rights information are represented. The content provider can keep, depending on what types of agreement the content provider has with the application provider, a count of how many copies of the content and application rights information have been distributed to the users, and what rights have been enabled. Finally, the content provider provides an accounting to the application provider based on the number of users and the context in which the content provider has enabled the disabled functions in the computer software application on the users' computers (330).

The above example of providing information and an accounting to the application provider is just an example of how this is done in one implementation of the invention. In a different implementation, the content provider provides an accounting to the application provider when the content provider attaches application rights information to the content file. In yet another implementation, the content provider can receive modified content back from the users, and provide information and an accounting to the application provider based on the number of returned copies of the content. One example of such a situation is if a content provider sends out an empty application form to be filled in and returned by the users.

The rights that a content provider can put in an enabler, and the rights of the content provider in general with respect to the generation of enablers and content, can further be controlled by a set of rules or assertions that are enforced by standard cryptographic techniques, such as a certification process based on public key cryptography. As in FIG. 2, in a different implementation of the invention, steps 325 and 330 are optional and depend on what type of agreement the content provider has with the application provider.

User's View

Figure 4:
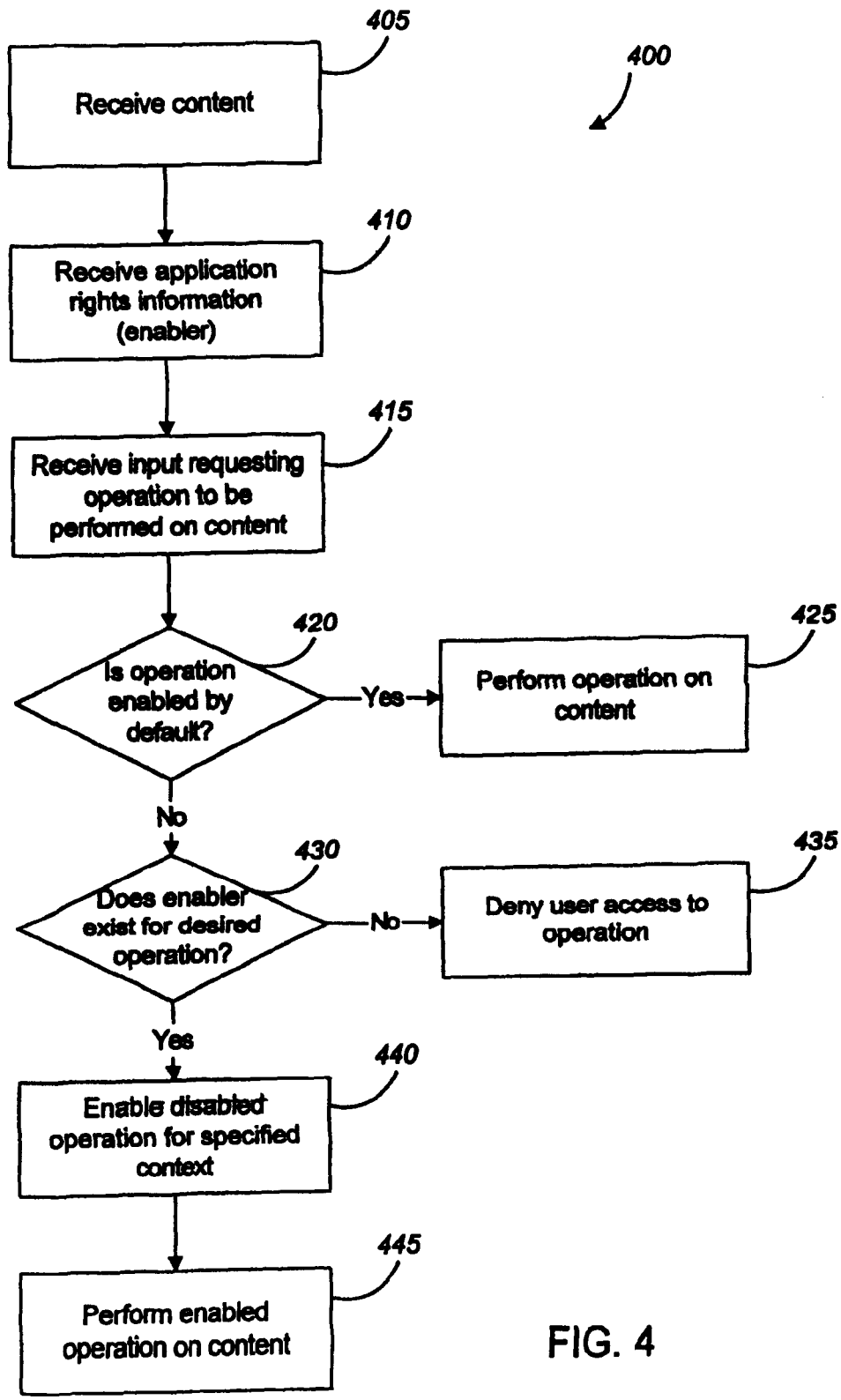
FIG. 4 is a flowchart showing a process from a user's point of view for performing operations on received content using a computer software application on a user's computer in accordance with the invention.

FIG. 4 shows a process (400) from a user's point of view for performing operations on received content using a computer software application on a user's computer. It is assumed that the user has already obtained and installed the computer software application from the application provider. The user receives content (405) from a content provider. The user application has a built-in hashing algorithm and a public key. The received content is checked to verify the content and application rights—for example, by confirming that the application rights dictionary is intact (i.e., that it has not been modified without authorization) and signed by the appropriate private key. The built-in hashing algorithm is also run on the received content and the result is compared with the hash provided in the document to detect whether the document has been significantly changed after it was prepared by the content provider. If all these tests are successful, the user software application can be certain that the content originates from a certified content provider.

The user also receives application rights information (410) in the form of one or more enablers. The receipt of the one or more enablers can occur before, simultaneously with, or after the receipt of the content, since the enablers are typically stored in a predetermined location on the user's computer, or in a remote location that is accessible for the computer software application on the user's computer and will be accessed from this location independently of when they arrived there. The process then receives an input requesting the computer software application to perform an operation on the received content (415). The input can be generated by a user, or by the received content itself. If the received document is a PDF document, as described above, the operations can be to view the document, print the document, add comments to the document, digitally sign the document, and so on.

The process then checks if the operation belongs to the set of enabled default operations in the computer software application (420). If the operation belongs to the set of enabled default operations, the process performs the operation on the content (425). If the operation does not belong to the set of enabled default operations, the process checks if in an enabler exists for the desired operation (430), that is, if the content provider has given the user the necessary rights to perform this additional operation on the content. In one implementation, the process performs the check by consulting an Application Rights Management (ARM) authority module in the computer software application. The ARM module can, at any point in time, determine which features are available for use by the user, by detecting the presence of enablers, for example, in the content file or document, or in one or more separate license files residing on the user's computer or at a remote location where the application rights information for that particular user is stored. If no enablers are detected, the process denies the user access to the requested operation (435). If there is an enabler for the requested operation, the process enables the additional operation within the context specified by the application rights information (440). Finally, the enabled operation is performed on the content (445).

Figure 5:
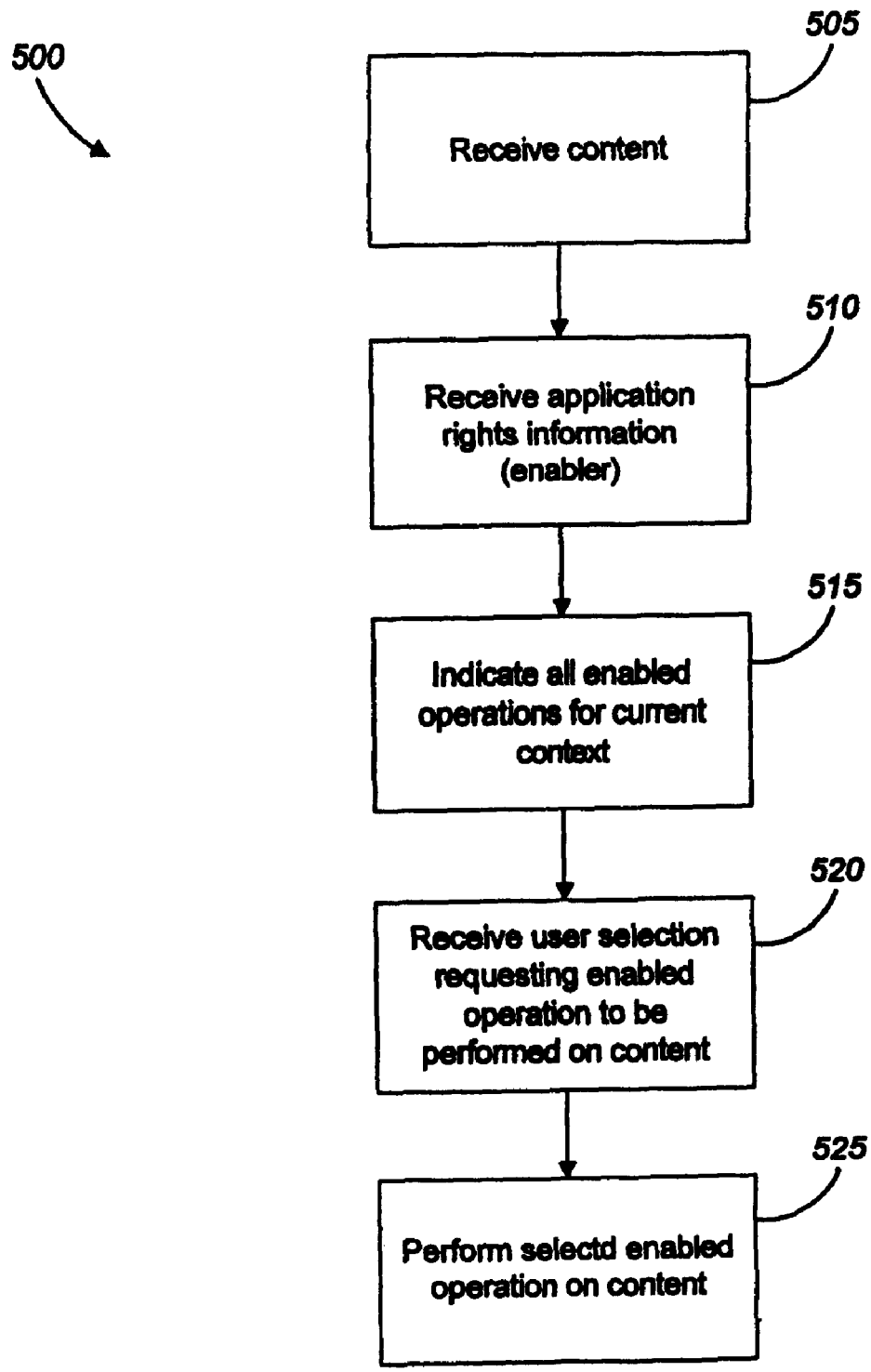
FIG. 5 is a flowchart showing another process from a user's point of view for performing operations on received content using a computer software application on a user's computer in accordance with the invention.

FIG. 5 shows an alternative process (500) from a user's point of view for performing operations on received content using a computer software application on a user's computer. Also here, it is assumed that the user has already obtained and installed the computer software application from the application provider. The user receives content (505) from a content provider and application rights information (510) in the form of one or more enablers, as was discussed above with FIG. 4. All the enabled operations in the current context are then indicated to the user (515). In one implementation the enabled operations are indicated to the user by making menu items, toolbar buttons, and so on, available for a user to click on when an enabler for the current context is present. The process then receives a user selection requesting the computer software application to perform an enabled operation on the received content (520), for example, by a user clicking with a mouse on an enabled menu item or toolbar button. Finally, the selected operation is performed on the content (525).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, a user can receive content and enablers in any order. There may be multiple content providers, of which some only generate enablers and others only generate content. An operation requested by a user or by content may not have access rights that are immediately granted, and can request that the user connects to a remote server to dynamically obtain the necessary application rights for that particular operation. The entity certifying the content providers to create application rights does not have to be the application provider, but can be a different entity that controls what different content providers are allowed to do. The selection of operations to be performed on received content does not have to be made directly by a user. Instead, the selection of operations can be directed by the computer software application or some sort of help or guidance system for the user, which takes the user proactively through the various steps that need to be performed. Application rights can be added to a document or other type of content on a sub-document level, for example, pages, or individual objects on the page. Additional public and private key pairs can be provided to users together with content to tailor application rights associated with the content. Application rights can be given dynamically to users in response to some user action or document state. For example, if a user receives a form, the user may originally have the rights to fill in blank spaces, and upon completion of all required blank spaces receive the rights to sign and submit the form. Accordingly, other embodiments are within the scope of the following claims.

What is claimed is:

1. A method comprising:
receiving a first content in a software application hosted in a computer system, the software application implementing a first operation that is disabled by default;
receiving a request in the computer system to operate on the first content using the first operation;
in response to the request, retrieving a first enabler from a database using the computer system, the first enabler specifying to the software application an enablement of the first operation only with respect to the first content; and
as a result of retrieving the first enabler, enabling, using the computer system, the first operation to operate on the first content within an operating context specified in the first enabler.

2. The method of claim 1, wherein the first content is content of an electronic document and wherein enabling the first operation comprises enabling one or more of:
adding content to the document, adding comments to the document, applying a digital signature to the document, saving the document, performing spell-check of the document, importing form data, exporting form data, submitting document data to the Internet outside a browser environment, and inserting new pages from a template.

3. The method of claim 2, wherein the document is a PDF document.

4. The method of claim 1, wherein the request to operate on the first content using the first operation is received from a user.

5. The method of claim 1, wherein retrieving the first enabler from the database comprises:
querying the database for an enabler that enables the first operation to operate on the first content.

6. The method of claim 1, wherein the operating context specified in the first enabler includes one or more of:
a particular document, a particular type of document, a particular data set, a particular type of data set, a particular computer, a particular set of computers, a particular user, a particular set of users, a particular session, a particular number of sessions, a particular time period, a particular content provider, and a particular document in a particular state.

7. The method of claim 6, wherein the particular state of the particular document is defined by a user.

8. The method of claim 1, wherein the first enabler is different for different operating contexts.

9. The method of claim 1, further comprising saving the first enabler on the computer system hosting the software application.

10. A method comprising:
in a software application hosted in a computer system, the software application implementing a first operation that is disabled by default, detecting a change of a state of a document;
after detecting the change, retrieving a first enabler using the computer system, the first enabler specifying to the software application an enablement of the first operation only with respect to the document; and
as a result of retrieving the first enabler, enabling, using the computer system, the first operation to operate on the document within an operating context specified in the first enabler.

11. The method of claim 10, wherein the change of the state of the document is detected by the software application.

12. The method of claim 10, further comprising:
monitoring a current state of the document; and
detecting a change of the state of the document when the current state satisfies one or more conditions.

13. The method of claim 12, wherein the current state of the document is monitored by the software application.

14. The method of claim 10, wherein the software application automatically initiates the retrieval of the first enabler from the database after the detecting.

15. The method of claim 10, wherein the software application automatically enables the first operation to operate on the document within the operating context specified in the first enabler associated with the document.

16. A software application, tangibly stored on a storage device medium, the software application comprising instructions operable to cause a programmable processor to:
receive a first content in a software application, the software application implementing a first operation that is disabled by default;
receive a request to operate on the first content using the first operation;
in response to the request, retrieve a first enabler from a database, the first enabler specifying to the software application an enablement of the first operation only with respect to the first content; and
as a result of the retrieval of the first enabler, enable the first operation to operate on the first content within an operating context specified in the first enabler.

17. The software application of claim 16, wherein the first content is content of an electronic document and wherein the instructions operable to cause the programmable processor to enable the first operation comprise instructions to enable one or more of:
adding content to the document, adding comments to the document, applying a digital signature to the document, saving the document, performing spell-check of the document, importing form data, exporting form data, submitting document data to the Internet outside a browser environment, and inserting new pages from a template.

18. The software application of claim 17, wherein the document is a PDF document.

19. The software application of claim 16, wherein the request to operate on the first content using the first operation is received from a user.

20. The software application of claim 16, wherein the instructions operable to cause the programmable processor to retrieve the first enabler from the database comprise instructions to:
query the database for an enabler that enables the first operation to operate on the first content.

21. The software application of claim 16, wherein the operating context specified in the first enabler includes one or more of:
a particular document, a particular type of document, a particular data set, a particular type of data set, a particular computer, a particular set of computers, a particular user, a particular set of users, a particular session, a particular number of sessions, a particular time period, a particular content provider, and a particular document in a particular state.

22. The software application of claim 21, wherein the particular state of the particular document in a particular state is defined by a user.

23. The software application of claim 16, wherein the first enabler is different for different operating contexts.

24. The software application of claim 16, further comprising instructions operable to cause the programmable processor to save the first enabler on a computer hosting the software application.

25. A software application, tangibly stored on a storage device medium, the software application implementing a first operation that is disabled by default, the software application comprising instructions operable to cause a programmable processor to:
detect a change of a state of a document;
after detection of the change, retrieve a first enabler from a database, the first enabler specifying to the software application an enablement of the first operation only with respect to the document; and
as a result of the retrieval of the first enabler, enable the first operation to operate on the document within an operating context specified in the first enabler.

26. The software application of claim 25, further comprising instructions operable to cause the programmable processor to:
monitor a current state of the document; and
detect a change of the state of the document when the current state satisfies one or more conditions.

27. The software application of claim 25, further comprising instructions operable to cause the programmable processor to:

automatically initiate the retrieval of the first enabler from the database after the change of state is detected.

28. The software application of claim 25, further comprising instructions operable to cause the programmable processor to:
    automatically enable the first operation to operate on the document within the operating context specified in the first enabler associated with the document.

29. A system comprising:
    a programmable processor; and
    a memory storing instructions operable to cause the programmable processor to:
        receive a first content in a software application, the software application implementing a first operation that is disabled by default;
        receive a request to operate on the first content using the first operation;
        in response to the request, retrieve a first enabler from a database, the first enabler specifying to the software application an enablement of the first operation only with respect to the first content; and
        as a result of the retrieval of the first enabler, enable the first operation to operate on the first content within an operating context specified in the first enabler.

30. The system of claim 29, wherein the first content is content of an electronic document and wherein to enable the first operation comprises enabling one or more of:
    adding content to the document, adding comments to the document, applying a digital signature to the document, saving the document, performing spell-check of the document, importing form data, exporting form data, submitting document data to the Internet outside a browser environment, and inserting new pages from a template.

31. The system of claim 30, wherein the document is a PDF document.

32. The system of claim 29, wherein the request to operate on the first content using the first operation is received from a user.

33. The system of claim 29, wherein to retrieve the first enabler from the database, the processor is operable to query the database for an enabler that enables the first operation to operate on the first content.

34. The system of claim 29, wherein the operating context specified in the first enabler includes one or more of:
    a particular document, a particular type of document, a particular data set, a particular type of data set, a particular computer, a particular set of computers, a particular user, a particular set of users, a particular session, a particular number of sessions, a particular time period, a particular content provider, and a particular document in a particular state.

35. The system of claim 34, wherein the particular state of the particular document is defined by a user.

36. The system of claim 29, wherein the first enabler is different for different operating contexts.

37. The system of claim 29, wherein the processor is further operable to save the first enabler on the computer system hosting the software application.

38. A system comprising:
    a programmable processor; and
    a memory storing instructions operable to cause the programmable processor to:
        detect a change of a state of a document;
        after detection of the change, retrieve a first enabler from a database, the first enabler specifying to a software application an enablement of a first operation only with respect to the document; and
        as a result of the retrieval of the first enabler, enable the first operation of the software application, the first operation being disabled by default, to operate on the document within an operating context specified in the first enabler.

39. The system of claim 38, wherein the processor is further operable to:
    monitor a current state of the document; and
    detect a change of the state of the document when the current state satisfies one or more conditions.

40. The system of claim 38, wherein the processor is further operable to automatically initiate the retrieval of the first enabler from the database after the change of state is detected.

41. The method of claim 38, wherein the processor is further operable to automatically enable the first operation to operate on the document within the operating context specified in the first enabler associated with the document.

* * * * *

UNITED STATES PATENT AND TRADEMARK OFFICE
CERTIFICATE OF CORRECTION

| | | |
|---|---|---|
| PATENT NO. | : 7,913,314 B2 | Page 1 of 1 |
| APPLICATION NO. | : 11/681915 | |
| DATED | : March 22, 2011 | |
| INVENTOR(S) | : Carl W. Orthlieb, James D. Pravetz and Sarah Rosenbaum | |

It is certified that error appears in the above-identified patent and that said Letters Patent is hereby corrected as shown below:

Column 14, Line 39, In Claim 41, delete "method" and insert -- system --

Signed and Sealed this
Thirty-first Day of May, 2011

David J. Kappos
*Director of the United States Patent and Trademark Office*